US010244813B2

(12) United States Patent
Mitchell

(10) Patent No.: US 10,244,813 B2
(45) Date of Patent: Apr. 2, 2019

(54) SANDALS WITH BIOMECHANICAL FOOT SUPPORT

(71) Applicant: VIONIC GROUP LLC, San Rafael, CA (US)

(72) Inventor: Terence Mitchell, Larkspur, CA (US)

(73) Assignee: VIONIC GROUP LLC, San Rafael, CA (US)

( * ) Notice: Subject to any disclaimer, the term of this patent is extended or adjusted under 35 U.S.C. 154(b) by 6 days.

(21) Appl. No.: 15/159,607

(22) Filed: May 19, 2016

(65) Prior Publication Data

US 2017/0332725 A1 Nov. 23, 2017

(51) Int. Cl.
| A43B 7/14 | (2006.01) |
| A43B 3/12 | (2006.01) |
| A43B 13/04 | (2006.01) |
| A43B 13/18 | (2006.01) |
| B29D 35/12 | (2010.01) |

(52) U.S. Cl.
CPC .............. *A43B 3/128* (2013.01); *A43B 7/141* (2013.01); *A43B 13/04* (2013.01); *A43B 13/181* (2013.01); *B29D 35/122* (2013.01)

(58) Field of Classification Search
CPC ......... A43B 3/128; A43B 7/141; A43B 13/04; A43B 13/181; A43B 3/101; A43B 13/20; A43B 3/246
USPC ........................................ 36/88, 91, 11.5, 10
See application file for complete search history.

(56) References Cited

U.S. PATENT DOCUMENTS

| 4,597,195 | A | | 7/1986 | Dananberg | 36/28 |
| 5,042,174 | A | | 8/1991 | Nichols | 36/25 R |
| 5,367,791 | A | | 11/1994 | Gross et al. | 36/31 |
| D353,936 | S | | 1/1995 | Vasyli | D2/961 |
| D357,349 | S | | 4/1995 | Vasyli | D2/961 |
| D358,249 | S | | 5/1995 | Vasyli | D2/961 |
| 5,746,011 | A | * | 5/1998 | Hedstrom | A43B 7/141 |
| | | | | | 36/140 |

(Continued)

FOREIGN PATENT DOCUMENTS

| CN | 2499223 | 7/2002 | ............. B29D 35/04 |
| CN | 102525029 | 7/2012 | ............. A43B 13/12 |

(Continued)

OTHER PUBLICATIONS

The Walking Company, "ABED B.I.O.system®" product brochure, 2015 (4 pgs).

(Continued)

*Primary Examiner* — Timothy K Trieu
(74) *Attorney, Agent, or Firm* — Hayes Soloway P.C.

(57) ABSTRACT

Sandals with biomechanical foot support, robust usability and cost-effectiveness are disclosed. The footwear may comprise a biomechanical sole and a Y-shaped rubber strap anchored to the sole. The sole has a top surface including a raised contour on the medial side of the sandal, and a low profile heel cup. The raised contour on the medial side and the heel cup match the natural anatomic shape of the foot, and thus provides a biomechanical foot support. The bottom surface of the sole may be a roughed surface to provide necessary traction and friction when a wearer/user walks. The bottom surface further comprises a plurality of grooves to allow water to be expelled and increase traction.

18 Claims, 5 Drawing Sheets

(56) References Cited

U.S. PATENT DOCUMENTS

| | | | | |
|---|---|---|---|---|
| 6,098,313 A * | 8/2000 | Skaja | A43B 13/181 36/28 |
| 6,523,206 B2 | 2/2003 | Royall | 12/142 N |
| 6,754,982 B2 | 6/2004 | Reed et al. | 36/30 A |
| D497,472 S | 10/2004 | Vasyli | D2/961 |
| D517,291 S | 3/2006 | Vasyli | D2/961 |
| 7,010,869 B1 | 3/2006 | Ellis, III | 36/25 R |
| D518,945 S | 4/2006 | Vasyli | D2/961 |
| 7,225,491 B2 | 6/2007 | Reed et al. | 12/142 P |
| D555,341 S | 11/2007 | Vasyli | D2/961 |
| D578,285 S | 10/2008 | Vasyli | D2/961 |
| D584,494 S | 1/2009 | Vasyli | D2/961 |
| D592,840 S | 5/2009 | Vasyli | D2/917 |
| D614,842 S | 5/2010 | Vasyli | D2/961 |
| D615,742 S | 5/2010 | Vasyli | D2/961 |
| D622,945 S | 9/2010 | Vasyli | D2/956 |
| 7,854,075 B2 | 12/2010 | Kosmas | 36/44 |
| D640,452 S | 6/2011 | Vasyli | D2/961 |
| 8,141,276 B2 | 3/2012 | Ellis | 36/103 |
| 8,166,674 B2 | 5/2012 | Dananberg | 36/43 |
| 8,341,856 B2 | 1/2013 | Smith et al. | 36/25 R |
| 8,640,363 B2 | 2/2014 | Hsu | 36/145 |
| D711,078 S | 8/2014 | Vasyli | D2/917 |
| D721,882 S | 2/2015 | Vasyli | D2/961 |
| D722,754 S | 2/2015 | Vasyli | D2/961 |
| D722,755 S | 2/2015 | Vasyli | D2/961 |
| D722,756 S | 2/2015 | Vasyli | D2/961 |
| D722,757 S | 2/2015 | Vasyli | D2/961 |
| D723,256 S | 3/2015 | Vasyli | D2/961 |
| D723,787 S | 3/2015 | Vasyli | D2/961 |
| D728,916 S | 5/2015 | Vasyli | D2/961 |
| D738,600 S | 9/2015 | Vasyli | D2/951 |
| D739,128 S | 9/2015 | Vasyli | D2/947 |
| D753,908 S | 4/2016 | Vasyli | D2/961 |
| 2003/0126770 A1 * | 7/2003 | Chen | A43B 7/00 36/141 |
| 2004/0064974 A1 | 4/2004 | Schuster | 36/91 |
| 2005/0050768 A1 | 3/2005 | Fehrensen et al. | 36/11.5 |
| 2006/0236561 A1 * | 10/2006 | Lee | A43B 3/108 36/25 R |
| 2008/0016724 A1 | 1/2008 | Hlavac | 36/30 R |
| 2008/0047167 A1 | 2/2008 | Pawlus et al. | 36/101 |
| 2010/0205831 A1 * | 8/2010 | Cheskin | A43B 1/0009 36/44 |
| 2011/0000102 A1 | 1/2011 | Chaw | 36/28 |
| 2011/0072685 A1 | 3/2011 | Gutowsky | A43B 7/142 |
| 2011/0099842 A1 | 5/2011 | Burke et al. | 36/44 |
| 2011/0179679 A1 | 7/2011 | Clark et al. | 36/30 R |
| 2011/0277349 A1 | 11/2011 | Kim | 36/84 |
| 2011/0314692 A1 * | 12/2011 | Marmar | A43B 3/108 36/11.5 |
| 2012/0000095 A1 | 1/2012 | Torrance | 36/132 |
| 2012/0023784 A1 | 2/2012 | Goldston | A43B 3/0031 |
| 2012/0090198 A1 | 4/2012 | Stratten | A43B 1/0045 |
| 2013/0014407 A1 | 1/2013 | Savage et al. | 36/88 |
| 2013/0125419 A1 | 5/2013 | Smith et al. | 36/92 |
| 2013/0160331 A1 | 6/2013 | Burke et al. | 36/25 R |
| 2013/0340295 A1 | 12/2013 | Adami et al. | 36/25 R |
| 2014/0250727 A1 | 9/2014 | VanDernoot et al. | 36/102 |
| 2014/0259769 A1 | 9/2014 | Bjornson et al. | 36/91 |
| 2014/0259801 A1 | 9/2014 | Grondin | A43B 13/187 |
| 2014/0298682 A1 | 10/2014 | Cavanagh et al. | 36/44 |
| 2015/0075035 A1 * | 3/2015 | Wreede | A43B 3/126 36/136 |
| 2015/0128447 A1 * | 5/2015 | Verona | A43B 3/122 36/11.5 |

FOREIGN PATENT DOCUMENTS

| | | | | |
|---|---|---|---|---|
| GB | 2483298 | 3/2012 | A43B 13/12 |
| WO | WO0054616 | 9/2000 | A43B 7/14 |
| WO | WO2006058013 | 1/2006 | A43B 13/18 |
| WO | WO2009126111 | 10/2009 | A43B 19/00 |
| WO | WO2011115850 | 9/2011 | A43B 5/00 |
| WO | WO2011160058 | 12/2011 | A43B 13/12 |
| WO | WO2013192259 | 12/2013 | A43B 5/02 |
| WO | WO2014138469 | 9/2014 | A43B 13/18 |

OTHER PUBLICATIONS

Dansko Collections, downloaded from http://footprints.com/pages/dansko, Aug. 14, 2015 (8 pgs).

Selena Thong Sandal-Cream, downloaded from http://www.aetrex.com/selena-thong-cream, Aug. 14, 2015 (2 pgs).

The Right Men's Shoes, downloaded from http://therightshoe.net/mens-shoes, Aug. 14, 2015 (2 pgs).

Spenco® TotalSupport™ Footwear, "Yumi" product brochure, 2012 (1 pg).

Office Action issued in U.S. Appl. No. 15/215,392, dated Apr. 19, 2018 (47 pgs).

U.S. Appl. No. 15/147,743, filed May 5, 2016.
U.S. Appl. No. 15/159,607, filed May 19, 2016.
U.S. Appl. No. 15/215,392, filed Jul. 20, 2016.

* cited by examiner

FIG. 1A
FIG. 1B
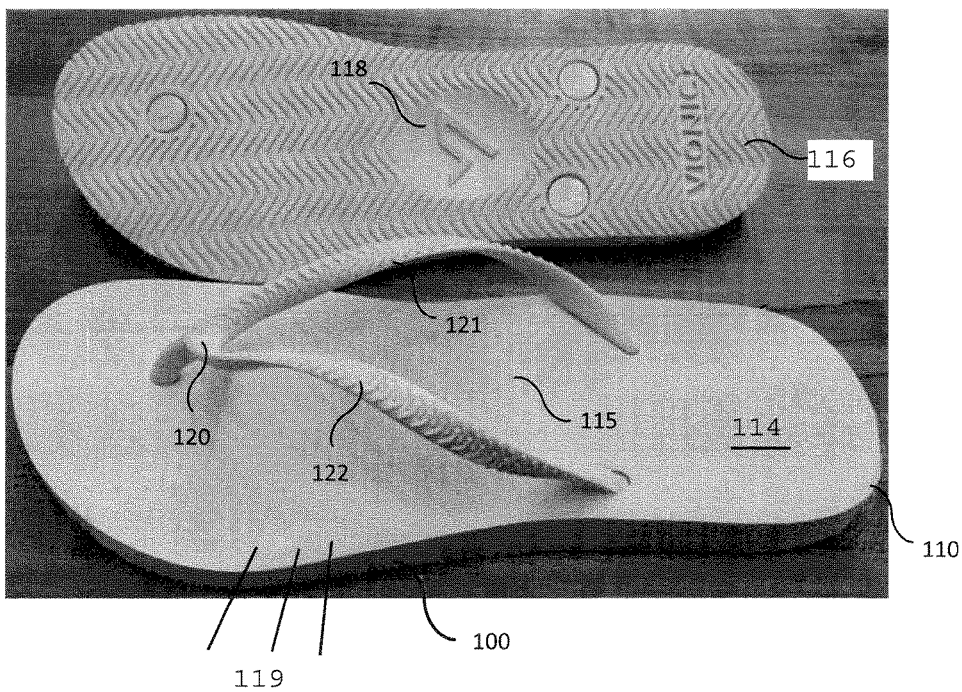
FIG. 1C
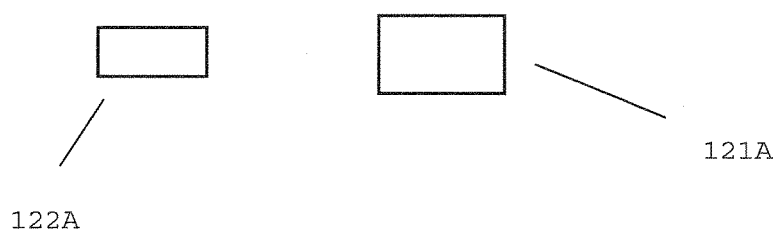

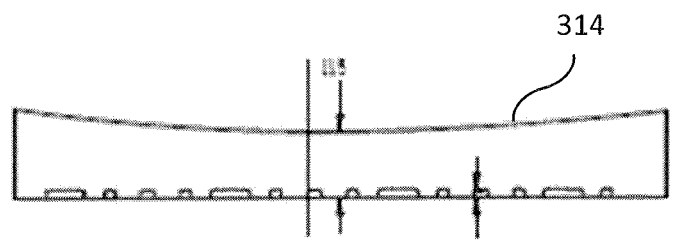
FIG. 3 (A) Cross-sectional view B1-B2
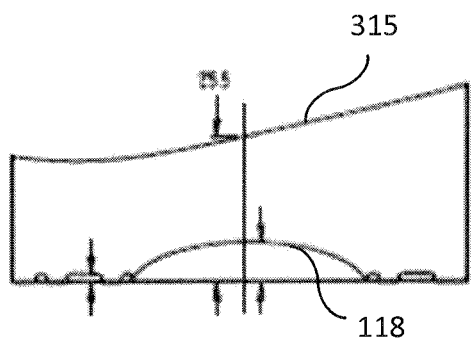
FIG. 3 (B) Cross-sectional view C1-C2
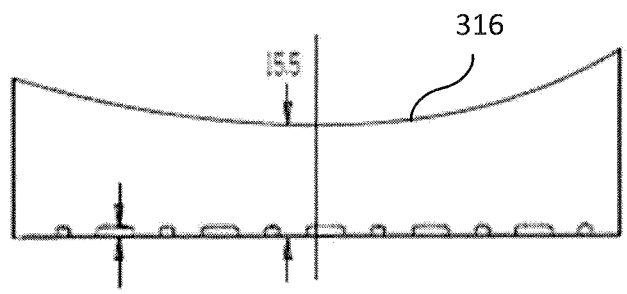
FIG. 3 (C) Cross-sectional view D1-D2

SANDALS WITH BIOMECHANICAL FOOT SUPPORT

FIELD OF THE DISCLOSURE

The present disclosure is generally related to shoes, and more particularly is related to sandals with biomechanical foot support.

BACKGROUND OF THE DISCLOSURE

Sandals are an open type of footwear, consisting of a sole held to the wearer's foot by straps passing over the instep. People usually wear sandals in warmer climates or during warmer parts of the year in order to keep their feet cool and dry. A sandal has a sole or foot support made from rubber, leather, wood, tatami or rope. It may be held to the foot by a narrow thong that generally passes between the first and second toe, or by a strap or lace, that passes over the arch of the foot or around the ankle.

Sandals may have different varieties. For example, flip-flops are a type of open-toed footwear sandal, typically consisting of a flat thin sole held loosely on the foot by a Y-shaped commonly strap that passes between the first and second toes and around both sides of the foot. They may also be held to the foot with a single strap over the top of the foot rather than a thong. Although flip-flops may provide wearers with some mild protection from hazards on the ground, due to their simple design and lack of support, flip flops generally are not considered the best footwear, especially for individuals with flat feet.

Innovations have been made to push the boundary for wearing comfort of sandals. U.S. Pat. No. 6,523,206 discloses a custom formed orthotic sandal to a biomechanically corrected shape of a user. A negative cast is taken of the user's foot to obtain the proper shape for the sandal. A positive impression cast is then formed from the negative cast to correct for biomechanical abnormalities of the user's foot. The custom orthotic sandal is formed by adhering a moldable material on the sole of the sandal. U.S. Patent application 2005/0050768 discloses a sandal for accommodating the normal mechanics of the foot. The sandals have a predetermined shape and degree of inclination for the rear foot bed, which incorporates layers of different materials. U.S. Pat. No. 7,854,075 discloses an orthotic insole reusable in open shoes. The insole has an adhesive layer which securely but temporarily bonds the insole to a shoe. The supporting insoles include an arch support and a heel lift.

However, the above innovations may either have production cost issues for mass production or delamination issues due to the multiple layer structure. It would be desirable to provide sandals with biomechanical foot support, robust usability and cost-effectiveness.

SUMMARY OF THE DISCLOSURE

Embodiments of the present disclosure provide sandals with biomechanical foot support, robust usability and cost-effectiveness. The footwear comprises a biomechanical sole and at least one strap anchored to the sole. The strap may be a Y-shaped rubber strap that passes between the first and second toes and around both sides of the foot. Alternatively, the strap may be a single strap over the top of the foot rather than a thong. The sole has a top surface including a raised contour on the medial side of the sandal, and a low profile heel cup. The raised contour on the medial side and the heel cup match the natural anatomic shape of the foot, and thus provides a biomechanical foot support. The bottom surface of the sole may be a roughed surface to provide necessary traction and friction when a wearer/user walks. The bottom surface may comprise a plurality of grooves to allow water to be expelled and increase traction. The groove pattern may or may not be uniform across the bottom surface.

In one embodiment, the sole comprises a unisole, i.e., single piece sole, made by direct single density injection. The sole may be made from elastic materials, such as rubber or foam, to provide a certain degree of flexibility. The sole may include a concavity under the arch which permits the foot bed of the sandal to deform or collapse from the top as a user walks, and thus provides an enhanced cushioning property compared to soles without the concavity.

In another embodiment, the Y-shaped rubber strap is anchored to the sole via a front anchor point and two rear anchor points. The two rear anchor points are slightly offset and because of that, the two arms of the Y-shaped strap have different lengths to accommodate the biomechanical action as the wearer walks. The Y-shaped rubber strap may be elastic. Furthermore, the two arms may have different degrees of elasticity to provide enhanced directional stability of sandals. The difference in elasticity may be realized by using the same material but different size for the two arms.

In yet another embodiment, the bottom surface of the sole is a tilted surface instead of a flat surface. The bottom surface is tilted up slightly in the front end to echo foot anatomical structure and thus provide biomechanical foot support for wearing comfort.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A and 1B illustrate bottom and top prospective views of a sandal with a biomechanical foot support in accordance with embodiments of the present disclosure, and FIG. 1C illustrates a cross-sectional cut of a strap in accordance with an embodiment of the present disclosure.

FIGS. 3A-3C illustrate various cross-sectional views of the biomechanical foot support in traverse direction in accordance with embodiments of the present disclosure.

DETAILED DESCRIPTION

Figure 2A:
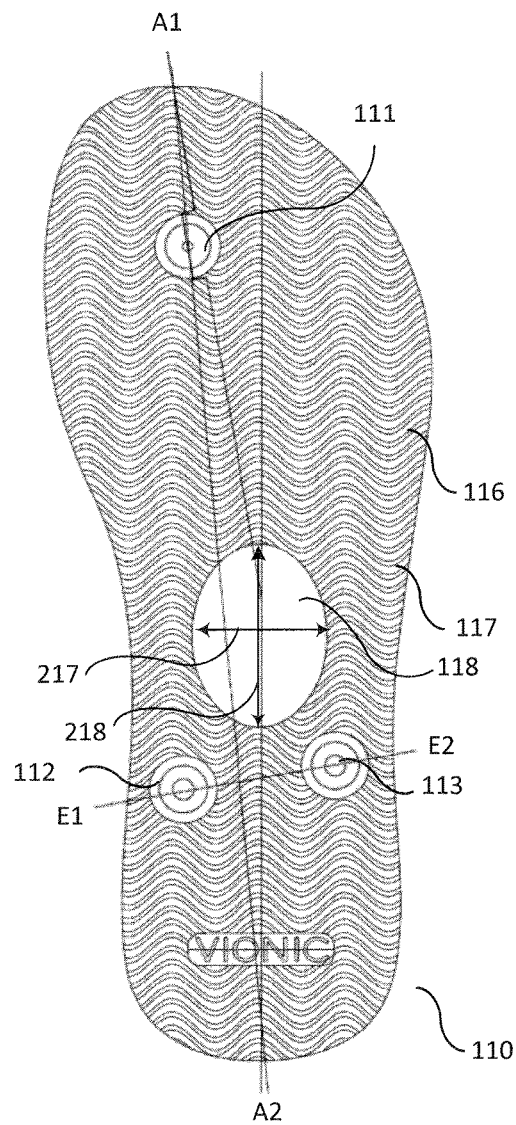
FIGS. 2A and 2B illustrate bottom and top views of the biomechanical foot support in accordance with embodiments of the present disclosure.

In the following description, for the purpose of explanation, specific details are set forth in order to provide understanding of the present invention. However, the present invention may be implemented without some of these details. The embodiments of the present invention described below may be incorporated into a number of different means, components and/or apparatus. Structures and devices shown in diagram are illustrative of exemplary embodiments of the present invention. When the specification makes reference to "one embodiment" or to "an embodiment", it is intended to mean that a particular feature, structure, characteristic, or function described in connection with the embodiment being discussed is included in at least one contemplated embodiment of the present invention. Thus, the appearance of the phrase, "in one embodiment" in different places in the specification does not constitute a plurality of references to a single embodiment of the present invention.

Various embodiments of the invention are related to sandals with biomechanical foot support, robust usability and cost-effectiveness. FIGS. 1A and 1B illustrate prospective views of a sandal with a biomechanical foot support in accordance with embodiments of the present disclosure. The sandal 100 comprises a biomechanical sole (or foot support) 110 and a strap 120 anchored to the sole via at least one anchor point. The strap may be a Y-shaped rubber strap comprising a first strap arm 121 and a second strap arm 122. The strap passes between the first and second toes (not shown in FIG. 1A or 1B) of a wearer and around both sides of a foot of the wearer. Alternatively, the strap may be a single strap over the top of the foot rather than a thong. The sole 110 has a top surface 114 and a bottom surface 116. The top surface has a front contour, a heel cup and a medial contour 115 (or a contoured arch). The top surface may also have a plurality of friction stems 119 to prevent slipping disposed at least on a portion of the top surface. The friction stems 119 may have various profiles and may also function as a soft massaging stems to the foot. In some embodiments, the medial contour may be raised to accentuate a functional arch, and thus provide better structure support for a user foot. In some embodiments, the bottom surface 116 has a concavity/cavity 118 displaced under medial contour 115. The cavity 118 permits the sole to deform or collapse from the top as a user walks, and thus provides an enhanced cushioning property compared to sole without the concavity.

In one embodiment, the sole is either compression-molded or injection-molded. The sole may be made from elastic materials, such as rubber or foam, to provide a certain degree of flexibility. The sole may be made with TPU (Thermoplastic polyurethane), PU (polyurethane), phylon, EVA (Ethylene-vinyl acetate) or other polymer materials. Furthermore, tiny gas bubbles may be incorporated within the sole during the molding process to make the sole lightweight. In one embodiment, the sole is constructed with a single density midsole for a simplified manufacturing process. In another embodiment, the sole is constructed with single density injection or a dual density midsole with different density combinations for function, stability, and comfort.

Figure 2B:
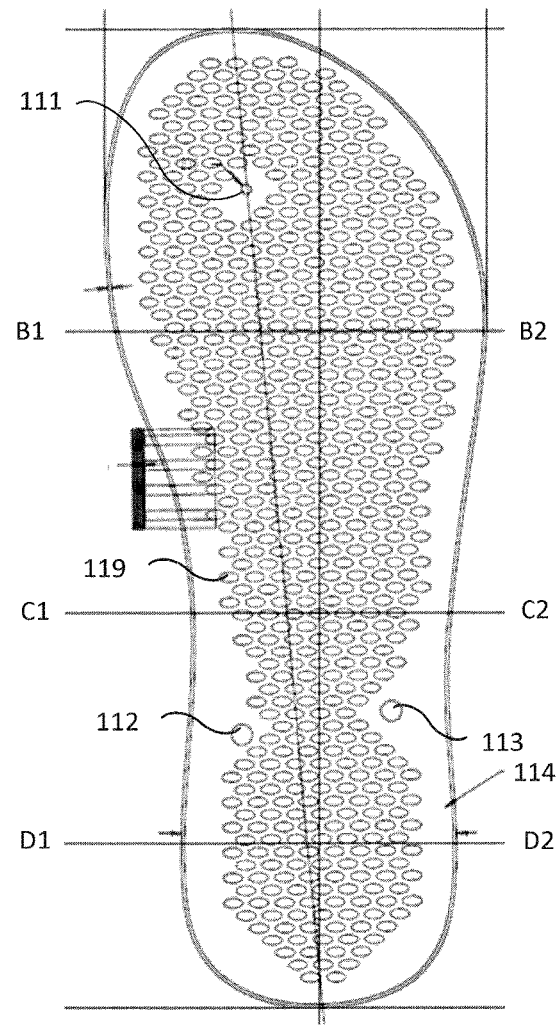

FIGS. 2A and 2B illustrate bottom and top views of the biomechanical foot support in accordance with embodiments of the present disclosure. As shown in FIG. 2 (A), the bottom surface 116 comprises a plurality of grooves 117 to allow deformation of the midsole during wearing movement. The grooves 117 may be straight line grooves, crossed groves, wave line grooves, or grooves with other patterns. The grooves also allow water to be expelled and thus increase traction when a user walks during raining days. The groove pattern may or may not be uniform through the bottom surface.

The cavity 118 may have various shapes, such as circle, oval, polygon, etc. in the exemplary embodiment shown in FIG. 2A, the cavity 118 has an oval shape. The oval has a long (or major) axis 218 and short (or minor) axis 217, with the long axis aligned to the longitudinal (or length) direction of the sole and the short axis aligned to the traverse (or width) direction of the sole. Such an oval cavity (or a general oval cavity) directional layout also matches foot arch structure and direction, thus provides optimized biomechanical cushion effect. The longitudinal (or length) direction is defined as a direction from heel area to toe area of the sole. The short axis 217 of the cavity 118 is less than the width of the sole wherein the cavity is disposed, such that the overall structure strength of the sole is retained. In some embodiments, the short axis 217 of the cavity 118 is around ½ of the width of the sole wherein the cavity is disposed.

Referring in particular to FIGS. 1B and 2B, in some embodiments, the sole also has a plurality of anchor points to attach a strap for a wearer to hold his/her foot. The Y-shaped strap 120 is anchored to the sole via a front anchor point 111 and two rear anchor points 112 and 113. As seen in FIGS. 1A and 1B, the two rear anchor points are slightly offset relative to the heel end of the sole and because of that, the two arms 121 and 122 of the Y-shaped strap have different lengths to accommodate the biomechanical action as the wearer walks. The Y-shaped strap may be an elastic strap, such as a rubber strap. Furthermore, the two arms 121 and 122 may have different cross sectional size (see FIG. 1C, elements 121A, 122A), and/or different elasticity to provide enhanced directional stability of sandals. The difference in elasticity may be realized by using the same material but different cross sectional size for the two arms. For example, when a user with toes pointing inward or outward during walking may have uneven pressure/force between foot inside and outside. The difference in elasticity in the strap arms may help alleviate the unbalance pressure and thus provide further biomechanical foot support for the wearer.

FIGS. 3A-3C illustrate various cross-sectional views of the biomechanical foot support in traverse direction in accordance with embodiments of the present disclosure. FIG. 3(A) is a cross-sectional view of the sole in front area along line B1-B2 (identified in FIG. 2B). The front contour 314 of the top surface may be a slight concave-up surface. Furthermore, the front contour 314 is symmetric with outside edge and inside edge levered on the same height. FIG. 3(B) is a cross-sectional view of the sole in medial area along line C1-C2 (identified in FIG. 2B). The medial contour 315 of the top surface may also be a slight concave-up surface. In one embodiment, the medial contour 315 is asymmetric with outside edge higher than the inside edge. The inside edge is corresponding to the edge of toward the foot arc. In another embodiment, the medial contour 315 is a raised contour higher than both the front contour 314 and heel cup 316. The raised contour on the medial side and the heel cup match the natural anatomic shape of the foot, and thus provides a biomechanical foot support. FIG. 3(C) is a cross-sectional view of the sole in heel cup area along line D1-D2 (identified in FIG. 2B). The heel cup 316 of the top surface may be a slight concave-up surface. Furthermore, the heel cup 316 is symmetric with the outside edge and inside edge levered on the same height.

Figure 4:
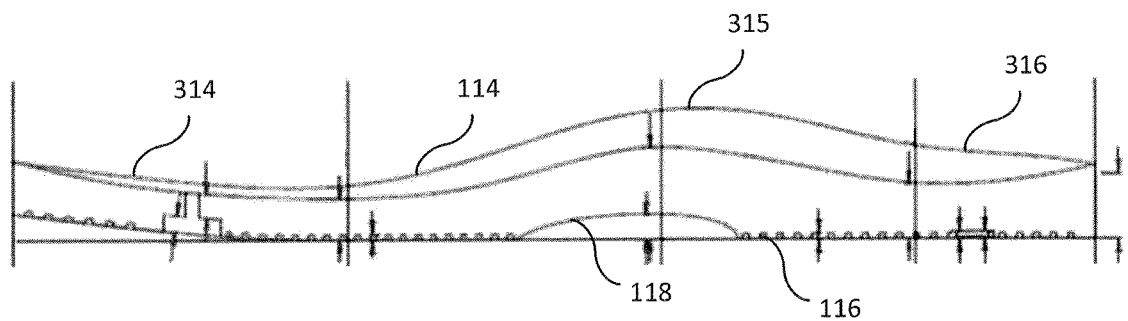
FIG. 4 illustrates a cross-sectional view of the biomechanical foot support in longitudinal direction in accordance with embodiments of the present disclosure.

FIG. 4 illustrates a cross-sectional view of the biomechanical foot support in longitudinal direction along line A1-A2 (identified in FIG. 2B) in accordance with embodiments of the present disclosure. As shown in FIG. 4, the bottom surface 116 of the sole 110 is not flat completely. The bottom surface 116 is tilted up slightly under the front contour to matches the natural anatomic shape of the foot. The cavity 118 may have depth between ¼ and ⅓ of the thickness of the medial contour 315 for the balance of cushion effects and sole structure robustness and/or the cavity 118 has a depth at its lowest point of between ¼ and ⅓ of the maximum thickness of the sole.

Figure 5:
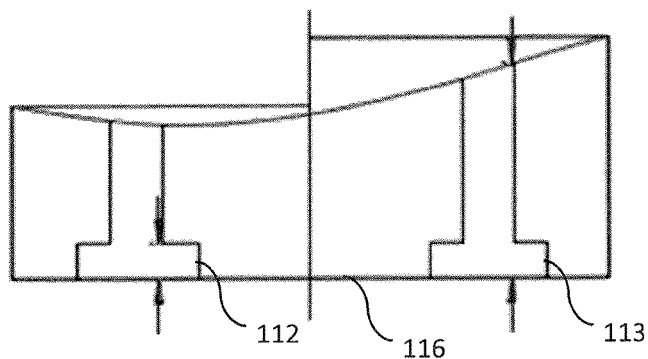
FIG. 5 illustrates a cross-section view of two rear anchor points on the biomechanical foot support in accordance with embodiments of the present disclosure.

FIG. 5 illustrates a cross-section view of two rear anchor points along line E1-E2 (identified in FIG. 2A) on the biomechanical foot support in accordance with embodiments of the present disclosure. The rear anchor points 112 and 113 shown in FIG. 5 are apertures with larger aperture diameter toward the bottom surface 116. Although a dual diameter configuration is shown in FIG. 5 for the anchor points, various other configurations may also be applicable for the anchor points. For example, instead of apertures, the anchor points may be a lamination point where the strap arms are attached to the sole.

Figure 6:
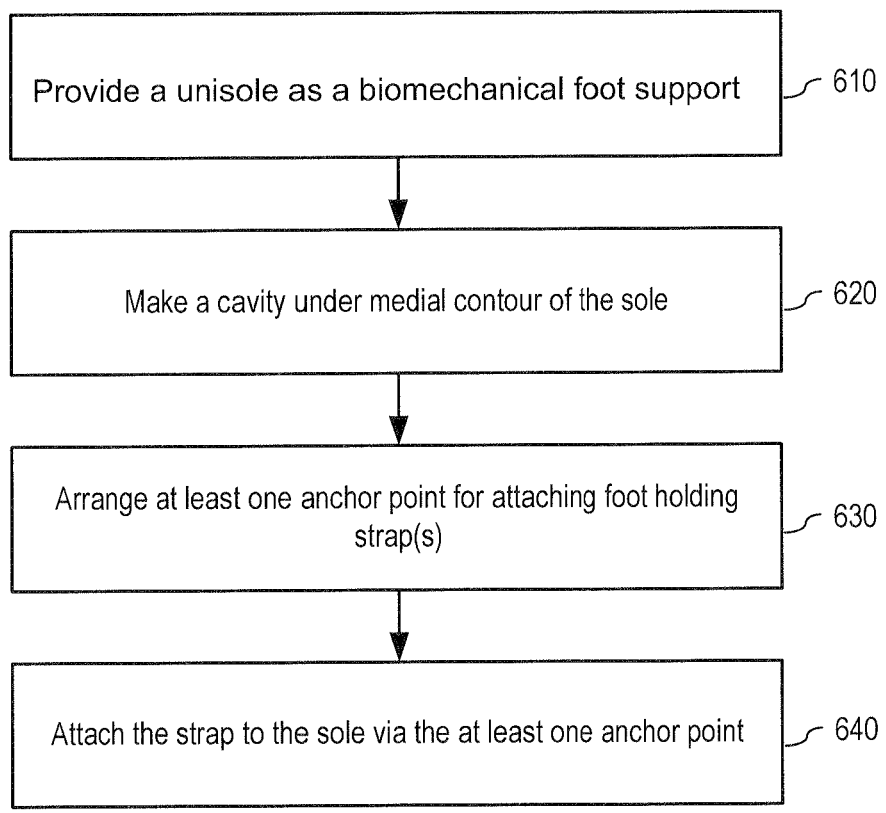
FIG. 6 illustrates a flow chart of a method for making a sandal with a biomechanical foot support in accordance with embodiments of the present disclosure.

FIG. 6 illustrates a flow chart of a method for making a sandal with a biomechanical foot support in accordance with embodiments of the present disclosure. The method begins at step 610 by providing a unisole as a biomechanical foot support. The sole is either compression-molded or injection-molded. The sole may also be made with rubber, foam, TPU (Thermoplastic polyurethane), PU (polyurethane), phylon, EVA (Ethylene-vinyl acetate) or other materials. The aforementioned top surface contours, heel cup, bottom grooves etc. may also be incorporated in this step. At step 620, a cavity is made under the medial contour of the sole to allow deformation of the midsole during wearing movement and thus provide additional cushioning. The cross section and depth of the cavity may be chosen to balance sole structure and cushion effect. At step 630, at least one anchor point is arranged for attaching a foot holding strap. The anchor point may be a hole, a place to apply glue or other bonding means. At step 640, the strap is attached to the sole via the at least one anchor point. The strap may be a typical Y-shape strap, a ribbon strap, a Snap-on strap, a hook and loop strap, etc. Furthermore, the two arms of the Y-shape strap may be different to provide enhanced biomechanical support for users with toes pointing inward or outward during walking.

It shall be noted that the above steps shown in FIG. 6 for making the sandal are performed under specific conditions using a specific embodiment or embodiments. Accordingly, neither these steps nor their results shall be used to limit the scope of the disclosure. Furthermore, it shall be noted that the method may be implemented by performing certain steps optionally, extra steps beyond the illustration of FIG. 6, performing certain steps in different orders, and/or performing certain steps concurrently. For example, steps 610, 620 and 630 may be integrated together in a single compression molding or injection-molding process with the aforementioned surface contour, grooves, cavity, and anchor points all included within the molding die.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A footwear product comprising:
a sole having a top surface and a bottom surface, the top surface comprising a foot supporting surface including a forefoot supporting contour, a raised medial contour and a concave heel cup, the bottom surface incorporating an oval-shaped cavity under the medial contour, the oval-shaped cavity having a major axis aligned in a longitudinal direction of the sole and a minor axis aligned in a traverse direction of the sole, wherein the oval-shaped cavity permits the sole to deform or collapse from the top when a user walks;
wherein the sole has a maximum thickness at a medial edge of the medial contour, and wherein the oval-shaped cavity has a depth at its lowest point of between ¼ and ⅓ of the maximum thickness of the sole;
a strap anchored to the sole via at least one anchor point.

2. The footwear product of claim 1 wherein the sole is made with thermoplastic polyurethane (TPU), polyethylene (PU), phylon, or Ethylene-vinyl acetate (EVA).

3. The footwear product of claim 1 wherein the sole is compression-molded or injection-molded.

4. The footwear product of claim 1 wherein the cavity is oval in plan.

5. The footwear product of claim 1 wherein the bottom surface comprises a plurality of grooves.

6. The footwear product of claim 5 wherein the grooves are straight line grooves, crossed groves, or wave line grooves.

7. A footwear product comprising:
a sole having a top surface and a bottom surface the top surface comprising a foot supporting surface including a forefoot supporting contour, a raised medial contour and a concave heel cup, the bottom surface incorporating an oval-shaped cavity under the medial contour, wherein the oval-shaped cavity has a depth at its lowest point of between ¼ and ⅓ a maximum thickness of the medial contour, and a major axis aligned in a longitudinal direction of the sole and a minor axis aligned in a traverse direction of the sole, wherein the oval-shaped cavity permits the sole to deform or collapse from the top when a user walks; and
a Y-shaped strap comprising a first strap arm and a second strap arm anchored to the sole via a front anchor point, a first rear anchor point and a second rear anchor point, the rear anchor points being offset relative to a heel end of the sole.

8. The footwear product of claim 7 wherein the sole is compression-molded or injection-molded.

9. The footwear product of claim 7 wherein the bottom surface comprises a plurality of grooves.

10. The footwear product of claim 7 wherein the Y-shaped strap is elastic.

11. The footwear product of claim 10 wherein the first strap arm and the second strap arm are different in elasticity.

12. The footwear product of claim 10 wherein the first strap arm, and the second strap are different in cross sectional size.

13. The footwear product of claim 7 wherein the top surface has a front contour, a raised medial contour and a heel cup.

14. The footwear of claim 13 wherein the front contour and heel cup are concaved up.

15. The footwear product of claim 13 wherein the bottom surface of the sole tilted up under the front contour.

16. A method for making a footwear product, comprising: providing a unisole as a biomechanical foot support, the unisole having a top foot supporting surface and a bottom surface, the top foot supporting surface comprising a forefoot supporting contour, a raised medial contour and a concave heel cup, the bottom surface incorporating a cavity under the medial contour having a major axis aligned in a longitudinal direction of the sole and a minor axis aligned in a traverse direction of the sole, wherein the sole has a maximum thickness at a medial edge of the medial contour, and wherein the cavity has a depth at its lowest point of between $\frac{1}{4}$ and $\frac{1}{3}$ of the maximum thickness of the sole; wherein the cavity permits the sole to collapse from the top when a user walks; and attaching a strap to the unisole via at least one anchor point on the sole.

17. The method of claim 16 wherein the unisole is compression-molded or injection-molded.

18. The method of claim 16 wherein the strap is a Y-shaped strap comprising a first strap arm and a second strap arm, the first strap arm and the second strap arm anchored to the unisole with an offset relative to a heel end of the sole.

* * * * *